US010284247B2

(12) United States Patent
Deb et al.

(10) Patent No.: US 10,284,247 B2
(45) Date of Patent: May 7, 2019

(54) SYSTEM AND METHOD FOR BIT PROCESSING IN A CENTRAL NETWORK COMPONENT

(71) Applicant: NXP B.V., Eindhoven (NL)

(72) Inventors: Abhijit Kumar Deb, Eindhoven (NL); Hubertus Gerardus Hendrikus Vermeulen, Eindhoven (NL); Sujan Pandey, Eindhoven (NL)

(73) Assignee: NXP B.V., Eindhoven (NL)

(*) Notice: Subject to any disclaimer, the term of this patent is extended or adjusted under 35 U.S.C. 154(b) by 175 days.

(21) Appl. No.: 13/913,971

(22) Filed: Jun. 10, 2013

(65) Prior Publication Data
US 2014/0362893 A1 Dec. 11, 2014

(51) Int. Cl.
| | | |
|---|---|---|
| H04B 1/38 | (2015.01) | |
| H04B 1/3822 | (2015.01) | |
| H04L 12/40 | (2006.01) | |

(52) U.S. Cl.
CPC ..... *H04B 1/3822* (2013.01); *H04L 12/40013* (2013.01)

(58) Field of Classification Search
CPC ............. H04L 12/40013; H04L 49/254; H04L 12/40026; H04L 49/15; H04L 2012/40241; H04L 12/66; H04L 49/55; G06F 13/385; G06F 11/0751; G06F 11/079; H04B 1/3822
See application file for complete search history.

(56) References Cited

U.S. PATENT DOCUMENTS

| | | |
|---|---|---|
| 5,101,339 A | 3/1992 | Fairman et al. |
| 5,706,278 A | 1/1998 | Robillard et al. |

(Continued)

FOREIGN PATENT DOCUMENTS

| | | |
|---|---|---|
| EP | 2178257 A1 | 4/2010 |
| WO | 9617304 A1 | 6/1996 |

(Continued)

OTHER PUBLICATIONS

Julien Schmaltz, "Formal verification of a time-triggered hardware interface", Open University of the Netherlands, The Netherlands, Mar. 2011.*

(Continued)

*Primary Examiner* — Aristocratis Fotakis
(74) *Attorney, Agent, or Firm* — Rajeev Madnawat

(57) ABSTRACT

A central network component, a FlexRay-compatible central network component, and a method for bit processing in a central network component are described. In one embodiment, a central network component for facilitating communication among communication nodes includes a bit oversampling module configured to oversample bits received from a first communication node of the communication nodes with an oversampling factor to generate oversampled bit streams, a time point selection module configured to select time points in the oversampled bit streams, where the time points correspond to inner samples of the oversampled bit streams with respect to the oversampling factor, and a bit outputting module configured to output the inner samples to a second communication node of the communication nodes between the time points. Other embodiments are also described.

14 Claims, 9 Drawing Sheets

(56) References Cited

U.S. PATENT DOCUMENTS

| | | | |
|---|---|---|---|
| 5,857,080 | A | 1/1999 | Jander et al. |
| 5,940,440 | A | 8/1999 | Werner et al. |
| 6,456,633 | B1 | 9/2002 | Chen |
| 6,633,606 | B1 | 10/2003 | Oh |
| 7,170,931 | B2 | 1/2007 | Greiss et al. |
| 8,004,993 | B2 | 8/2011 | Angelow |
| 8,265,100 | B2 | 9/2012 | Steiner et al. |
| 2002/0027953 | A1 | 3/2002 | Hwang et al. |
| 2003/0093727 | A1* | 5/2003 | Belschner et al. ............. 714/56 |
| 2003/0109270 | A1 | 6/2003 | Shorty |
| 2003/0192003 | A1 | 10/2003 | Das et al. |
| 2004/0022222 | A1 | 2/2004 | Clisham |
| 2004/0081079 | A1* | 4/2004 | Forest ................ H03M 13/43 370/216 |
| 2004/0090962 | A1* | 5/2004 | Forest ................ H03M 13/43 370/392 |
| 2005/0128950 | A1* | 6/2005 | Hall et al. ................... 370/235 |
| 2005/0129055 | A1 | 6/2005 | Hall et al. |
| 2005/0135404 | A1 | 6/2005 | Zumsteg et al. |
| 2005/0254518 | A1 | 11/2005 | Fujimori |
| 2005/0283681 | A1 | 12/2005 | Jeddeloh |
| 2006/0024056 | A1 | 2/2006 | Erisman et al. |
| 2007/0081548 | A1 | 4/2007 | Jiang |
| 2008/0205565 | A1* | 8/2008 | Fuhrmann et al. .......... 375/355 |
| 2008/0232649 | A1* | 9/2008 | Taylor .................... H04L 7/04 382/117 |
| 2009/0046593 | A1 | 2/2009 | Ptasinski et al. |
| 2009/0046732 | A1 | 2/2009 | Pratt, Jr. et al. |
| 2009/0086653 | A1 | 4/2009 | Driscoll et al. |
| 2009/0122812 | A1 | 5/2009 | Steiner et al. |
| 2009/0175290 | A1 | 7/2009 | Newald et al. |
| 2009/0193317 | A1* | 7/2009 | Luedeke ................... 714/776 |
| 2009/0213870 | A1 | 8/2009 | Terasawa et al. |
| 2009/0262649 | A1 | 10/2009 | Zinke et al. |
| 2010/0014439 | A1* | 1/2010 | Fuhrmann et al. ........... 370/252 |
| 2010/0020828 | A1 | 1/2010 | Angelow |
| 2010/0064082 | A1 | 3/2010 | Ihle et al. |
| 2010/0202347 | A1 | 8/2010 | Sridhara et al. |
| 2010/0208755 | A1* | 8/2010 | Shimamura ...... H04L 12/40006 370/498 |
| 2010/0220744 | A1* | 9/2010 | Ungermann et al. ......... 370/458 |
| 2010/0268910 | A1 | 10/2010 | Papenhoven |
| 2011/0093759 | A1 | 4/2011 | Song et al. |
| 2011/0103390 | A1 | 5/2011 | Hall et al. |
| 2011/0141220 | A1 | 6/2011 | Mirua |
| 2011/0208884 | A1* | 8/2011 | Horihata ...................... 710/105 |
| 2012/0020430 | A1 | 1/2012 | Haase et al. |
| 2012/0124427 | A1 | 5/2012 | Haug |
| 2014/0064289 | A1* | 3/2014 | Yanagida et al. ............. 370/400 |

FOREIGN PATENT DOCUMENTS

| | | |
|---|---|---|
| WO | 01/01639 A1 | 1/2001 |
| WO | 0130028 A2 | 4/2001 |
| WO | 2006067673 A2 | 6/2006 |
| WO | 2009063347 A1 | 5/2009 |

OTHER PUBLICATIONS

FlexRay Communications System, Preliminary Central Bus Guardian Specification, Version 2.0.9, Dec. 2005.*

FlexRay 3.0.1—"FlexRay Communications System Electrical Plysical Layer Application Notes", Version 3.0.1, Oct. 2010.*

Stefan Aschenbach, "Flexray", Funktion des Automobil kommunkations systems, Oct. 23, 2006.*

Extended European Search Report for European Patent Appln. No. 14161146.7 (dated Jun. 23, 2014).

FlexRay Communications System Protocol Specification, ver 3.0.1, FlexRay consortium.

FlexRay Communications System Preliminary Central Bus Guardian Specification, ver 2.0.9, FlexRay consortium, [Online], http://www.flexray.com (as of Dec. 22, 2010).

Gall, et al. "FlexRay Active Star with Bit-Reshaper: Enabling Extended Network Topologies and More Reliable Communication", EE Times Europe, Jun. 8, 2011.

Extended European Search Report, Application No. 12181625.0, dated Feb. 11, 2013.

"FlexRay Communications System Protocol Specification, ver. 2.1, Rev. A", FlexRay consortium, 246 pgs; Dec. 2005.

FlexRay Communications System Protocol Specification, ver. 3.0, FlexRay consortium, Dec. 2009.

Milbredt, P. et al.; "Switched FlexRay: Increasing the Effective Bandwidth and Safety of FlexRay Networks", in Proc. IEEE Conf. Emerging Technologies and Factory Automation (ETFA), pp. 1-8, 2010.

FlexRay Communications System Protocol Specification, ver 2.1, Rev. E, FlexRay consortium, [Online] http://www.flexray.com (as of Dec. 22, 2010).

Extended European Search Report, Application No. 12181346.3, dated Jan. 2, 2013.

Extended European Search Report, Application No. 12181324.0, dated Mar. 21, 2013.

CAN Specification, Robert Bosch GmbH, Ver. 2.0, 1991.

LIN Specification Package, LIN Consortium, Rev. 2.1, Nov. 2006.

FlexRay Communications System Protocol Specification, ver. 2.1, Revision E, Consortium internal release, pp. 1-318, Jun. 5, 2009.

\* cited by examiner

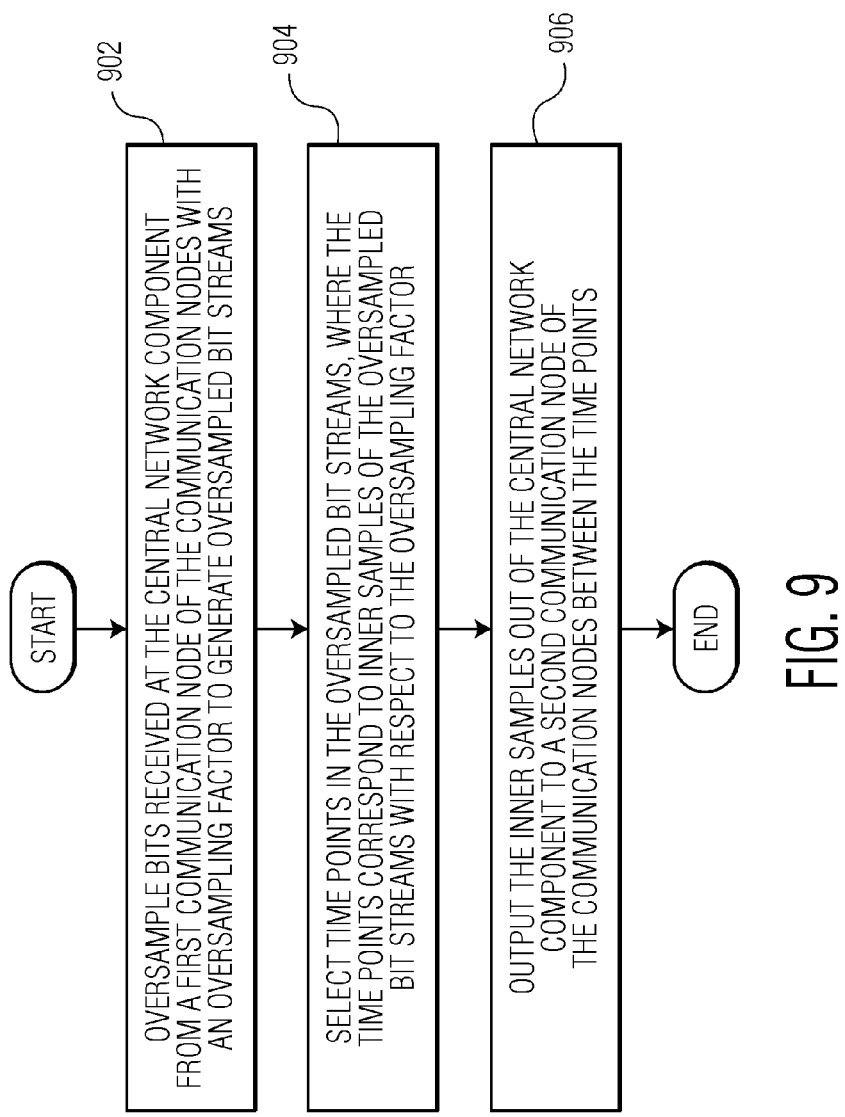

SYSTEM AND METHOD FOR BIT PROCESSING IN A CENTRAL NETWORK COMPONENT

Embodiments of the invention relate generally to processing systems and methods and, more particularly, to systems and methods for bit processing for a central network component.

Communication devices in an application system can communicate with each other directly or through a communication hub device. Signals that are transmitted from a transmitter device can be distorted before being received by a receiver device. Shortening or prolonging of the length of a transmitted bit is referred to as a bit length distortion. The bit length distortion may be caused by static delays due to, such as, topology or terminators, or stochastic delays due to, such as, Electromagnetic interference (EMI) or clock jitters. Because of the bit length distortion, the receiver device may not be able to correctly recognize the received bit. To deal with the bit length distortion, the receiver device typically performs some form of bit length correction. The situation gets even worse when the transmitter and receiver nodes are connected via a central network component and the central component forwards the distorted bit stream from the transmitter to the receiver. Further interferences in the link between the central component and the receiver may cause more distortions and the receiver may not be able to recover the received bit stream correctly.

Conventionally, a buffer, such as a First In First Out (FIFO) buffer, is used in a central component for bit length correction purpose. For example, a buffer can be added between a decoder and a subsequent encoder to temporarily store data (e.g., data bits) that is transferred from the decoder to the encoder. Saving the decoded bits in the buffer allows the decoded bits to be correctly encoded and transmitted to other devices. However, having such a buffer introduces a delay in the signal path. Typically, a time budget is allocated for the bit processing of a central component. The delay introduced by the buffer may cause the total delay in the central component to exceed the time budget. In addition to the delay, the added buffer also increases the silicon area of the receiver device. For example, if a central component has to allow simultaneous communication in parallel, it needs a buffer for each parallel communication. However, having multiple buffers increases the silicon area.

A central network component, a FlexRay-compatible central network component, and a method for bit processing in a central network component are described. In one embodiment, a central network component for facilitating communication among communication nodes includes a bit oversampling module configured to oversample bits received from a first communication node of the communication nodes with an oversampling factor to generate oversampled bit streams, a time point selection module configured to select time points in the oversampled bit streams, where the time points correspond to inner samples of the oversampled bit streams with respect to the oversampling factor, and a bit outputting module configured to output the inner samples to a second communication node of the communication nodes between the time points. Other embodiments are also described.

In one embodiment, a FlexRay-compatible central network component for facilitating communication among FlexRay-compatible communication nodes in an automobile system includes a bit processing unit comprising: a bit oversampling module configured to oversample bits received from a first FlexRay-compatible communication node of the FlexRay-compatible communication nodes with an oversampling factor to generate oversampled bit streams, a time point selection module configured to select time points in the oversampled bit streams, where the time points correspond to inner samples of the oversampled bit streams with respect to the oversampling factor, and a bit outputting module configured to output the inner samples to a second FlexRay-compatible communication node of the FlexRay-compatible communication nodes between the time points.

In one embodiment, a method for bit processing in a central network component for facilitating communication among communication nodes involves oversampling bits received at the central network component from a first communication node of the communication nodes with an oversampling factor to generate oversampled bit streams, selecting time points in the oversampled bit streams, where the time points correspond to inner samples of the oversampled bit streams with respect to the oversampling factor, and outputting the inner samples out of the central network component to a second communication node of the communication nodes between the time points.

Other aspects and advantages of embodiments of the present invention will become apparent from the following detailed description, taken in conjunction with the accompanying drawings, depicted by way of example of the principles of the invention.

FIG. 9 is a process flow diagram of a method for bit processing in a communication device in accordance with an embodiment of the invention.

Throughout the description, similar reference numbers may be used to identify similar elements.

It will be readily understood that the components of the embodiments as generally described herein and illustrated in the appended figures could be arranged and designed in a wide variety of different configurations. Thus, the following detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

Figure 1:
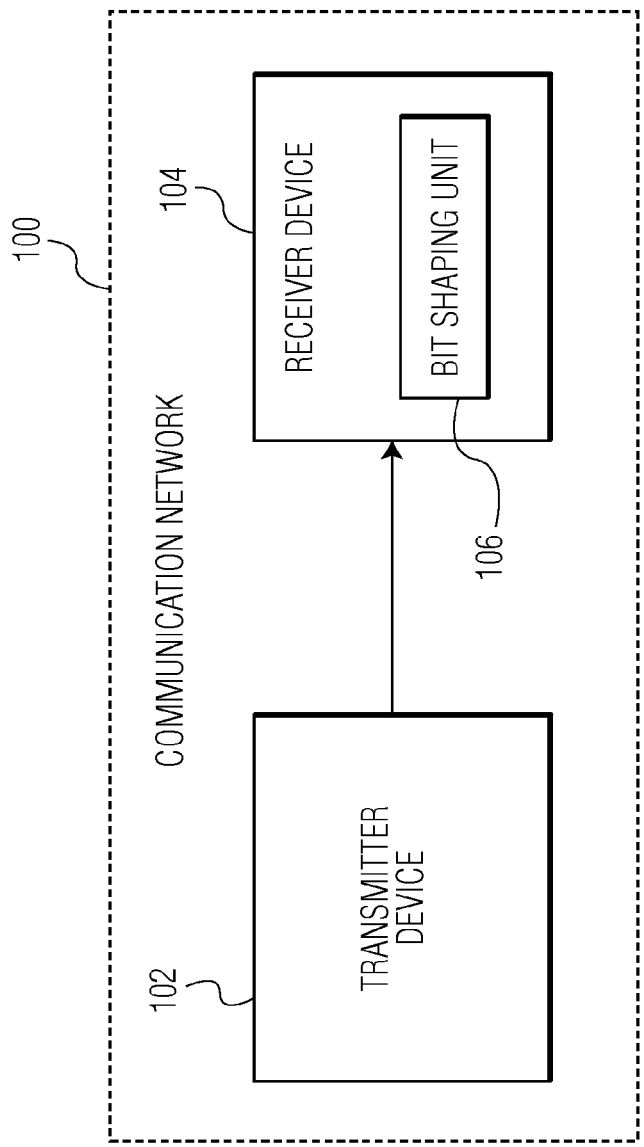
FIG. 1 is a schematic block diagram of a communication network in accordance with an embodiment of the invention.

FIG. 1 is a schematic block diagram of a communication network 100 in accordance with an embodiment of the invention. The communication network is configured to facilitate communication among communication devices. In the embodiment depicted in FIG. 1, the communication network 100 includes a transmitter device 102 configured to transmit data and a receiver device configured to receive data 104. The data transmitted by the transmitter device and received by the receiver device can be in any suitable format. In an embodiment, the data transmitted and received are data frames. A data frame may include a header segment, a payload segment used to convey application data, and a trailer segment. In addition to communication, each of the transmitter device and the receiver device may be configured to perform at least one additional function. For example, the transmitter device and/or the receiver device may perform an automotive application. The transmitter device may also be able to receive signals, for example, from the receiver device. The receiver device may also be able to transmit signals, for example, to the transmitter device.

Signals that are transmitted from the transmitter device 102 can be distorted before being received by the receiver device 104. For example, different factors within the communication network 100 can shorten or prolong the length of a transmitted bit. Due to the bit length distortion, the receiver device may not be able to correctly recognize the received bit. To tackle the bit length distortion, the receiver device performs an operation for correction of the bit length distortion, which is also referred to as bit reshaping, to reshape shortened and prolonged bits.

In the embodiment depicted in FIG. 1, the receiver device 104 includes a bit shaping unit 106 configured to perform bit length correction. The bit shaping unit can perform the bit length adjustment using various techniques, such as, oversampling, majority voting, bit strobe and sample counter adjustment. In an embodiment, the bit shaping unit oversamples digital bits received at the receiver device to generate oversampled bit streams, selects strobing time points that correspond to inner samples in the oversampled bit streams, and outputs the inner samples out of the communication device between the strobing time points. An inner sample of an oversampled bit stream is a bit sample that is located between the outer or end samples of the oversampled bit stream. For example, for a bit stream that has five bit samples, an inner sample can be the second bit sample, the third bit sample, or the fourth sample of the bit stream. In another example, for a bit stream that has six bit samples, an inner sample can be the second bit sample, the third bit sample, the fourth sample, or the fifth sample of the bit stream. In some embodiment, an inner sample of an oversampled bit stream is a middle sample where the sample counter is near the half of an oversampling factor. The receiver device uses the strobing point based bit reshaping technique, which does not require any additional buffer.

In an exemplary operation of the communication network 100, the transmitter device 102 and the receiver device 104 agree on an oversampling factor and a fixed number of bits between which a synchronization edge (e.g., a rising signal edge or a falling signal edge) is transmitted. The receiver device sets a sample counter to one and increments the sample counter every time a new sample is received. The receiver device resets the sample counter back to one when the value of the sample counter becomes equal to the oversampling factor or when a synchronization edge is received. Specifically, when the number of samples received becomes equal to the over sampling factor, the value of the sample counter becomes equal to the over sampling factor, which indicates that all samples related to the current bit have been received. Consequently, the sample counter is reset to one such that the first sample of the next bit is properly numbered. When a synchronization edge is received, the sample counter is reset back to one. If there is a deviation between the clocks of the receiver device and transmitter device, the sample counter will not read one at this moment. In this case, the sample counter is reset to align the receiver device to the clock speed of the transmitter device. If there is no deviation between the clocks of the receiver device and the transmitter device, the sample counter will become one at the moment of a transition that marks the beginning of the next bit level.

Figure 2:
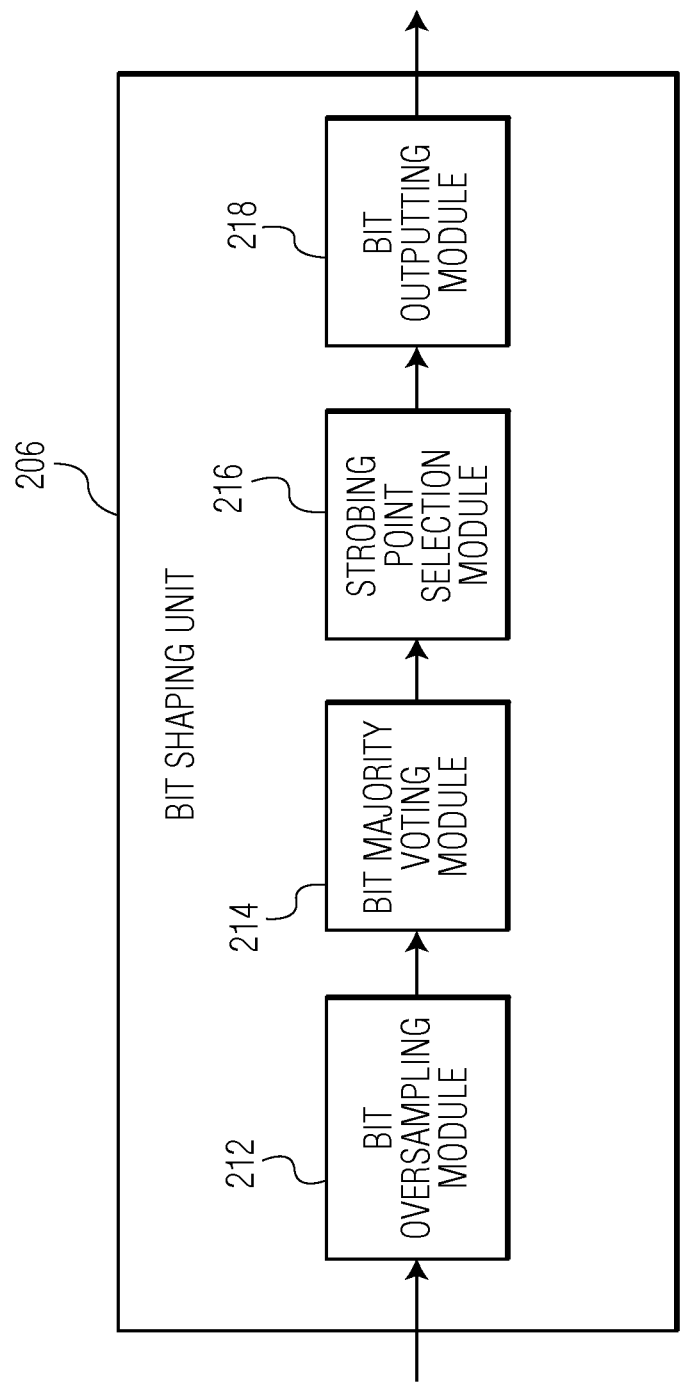
FIG. 2 depicts a first embodiment of a bit shaping unit of a receiver device of the communication network depicted in FIG. 1.

Two embodiments of the bit shaping unit 106 are described with respect to FIGS. 2-5. FIG. 2 depicts a first embodiment of the bit shaping unit 106. In the embodiment depicted in FIG. 2, a bit shaping unit 206 includes a bit oversampling module 212, a bit majority voting module 214, a strobing point selection module 216, and a bit outputting module 218.

The bit oversampling module 212 is configured to oversample digital bits received at the receiver device to generate oversampled bit streams with an oversampling factor. The bit majority voting module 214 is configured to perform majority voting on each of the oversampled bit streams. The bit majority voting module 214 is optional. Thus, in some embodiments, the bit shaping unit 206 does not include the bit majority voting module 214. The strobing point selection module 216 is configured to select strobing time points in the oversampled bit streams after the optional majority voting, which correspond to inner samples of the oversampled bit streams with respect to the oversampling factor. The bit outputting module 218 is configured to output the inner samples out of the communication device between the strobing time points.

In an embodiment, the bit oversampling module 212 oversamples a bit received at the receiver device 104 to generate an oversampled bit stream and the bit majority voting module 214 performs majority voting on the oversampled bit stream. The strobing point selection module 216 selects the current strobing time point from an inner sample in the oversampled bit stream after majority voting and the bit outputting module 218, from the current strobing time point, keeps the inner sample as the output bit of the receiver device until a next strobing time point. The next strobing time point can be generated in the same fashion as the current strobing time point, for example, the bit oversampling module 212 oversamples the next bit received at the receiver device to generate the oversampled bit stream and the bit majority voting module 214 performs majority voting on the subsequent oversampled bit stream. The strobing time point selection module 216 selects the next strobing time point from an inner sample in the second oversampled bit stream after majority voting.

Figure 3:
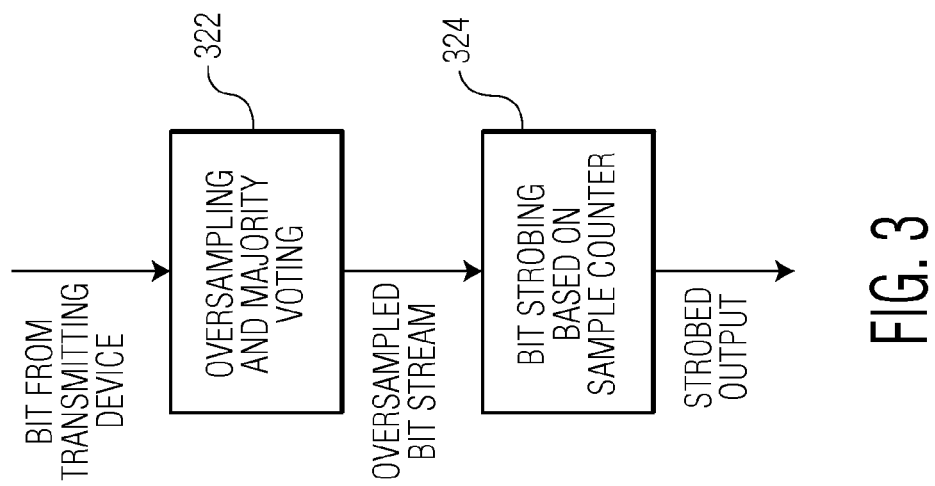
FIG. 3 illustrates an example operation of the bit shaping unit depicted in FIG. 2.

FIG. 3 illustrates an example operation of the bit shaping unit 206 depicted in FIG. 2. In the embodiment depicted in FIG. 3, the example operation includes an oversampling and majority voting process 322 and a bit strobing process 324 that is based on a sample counter. The bits from the transmitter device 102 are oversampled at the input of the receiver device 104, e.g., at the bit oversampling module 212, with an oversampling factor. For example, a single bit is oversampled to a bit stream and the number of bits in the bit stream is equal to the oversampling factor. The oversampling factor is a positive integer that is typically set to at least 3 or higher. For example, one bit can be oversampled with an oversampling factor of 5 to a bit stream having 5 bits. The oversampling factor may be known to the transmitter device or even designated by the transmitter device.

In some cases, short duration glitches may appear in the oversampled bits. Short duration glitches can cause distortion in the oversampled bits, such as, changing of the value of a bit. To remove short duration glitches, a majority voting of the oversampled bits may be performed. In an embodiment, a sliding window consisting of odd number of samples is used for majority voting. In this embodiment, the value of the majority of the samples within the sliding window is chosen as the output of the bit majority voting unit 214. For example, a sliding window of 3 samples can be used for filtering out in a single erroneous bit. However, majority voting generally cannot cure bit length distortion. Although the majority voted output will be glitch free, the duration of the consecutive bits may still be different from each other.

To reshape the bit length, a bit strobing technique is used. The majority voting does not change the oversampling factor. Consequently, whether the majority voting takes place or not, the strobing point selection module 216 receives as many samples per transmitted bit as the oversampling factor. The strobing point selection module 216 strobes the oversampled values at a strobing time point and the bit outputting module 218 keeps outputting that strobed bit value until the next strobing time point. Because a strobed bit value is kept as the output of the receiver device 104 until the next strobing time point, the length of an output bit is the same as the spacing between two consecutive strobing time points. The strobing time point is selected such that the strobed bit corresponds to nearly the inner sample with respect to the over sampling factor. Such a strobing time point corresponds to the inner of the eye diagram of the received bits, where a clean signal appears. The eye diagram is an oscilloscope display of a digital signal, repetitively sampled to get a good representation of its behavior. In an embodiment, the strobing time point selection module uses a sample counter, which is set to '1' at the beginning, and increments with the arrival of each oversampled value. At the strobing time point, the received sample becomes the output of the receiver device and is held until the next strobing time point. The strobing point selection module 216 selects the oversampled value as the output when the sample counter becomes half (or nearly the half) of the oversampling factor. For example, in an oversampling scheme without an oversampling factor of 8, the strobing point selection module will select the $4^{th}$ or the $5^{th}$ sample to the output, and the bit outputting module holds the selected sample as output until the next strobing time point. However, in some embodiments, the strobing time point may not be in exactly the middle of the bit stream. For example, for an oversampling factor of 16, the $11^{th}$ sample can be chosen as the strobing time point if a cleaner eye opening in the eye diagram is seen slightly after the mid-sample.

Figure 4:
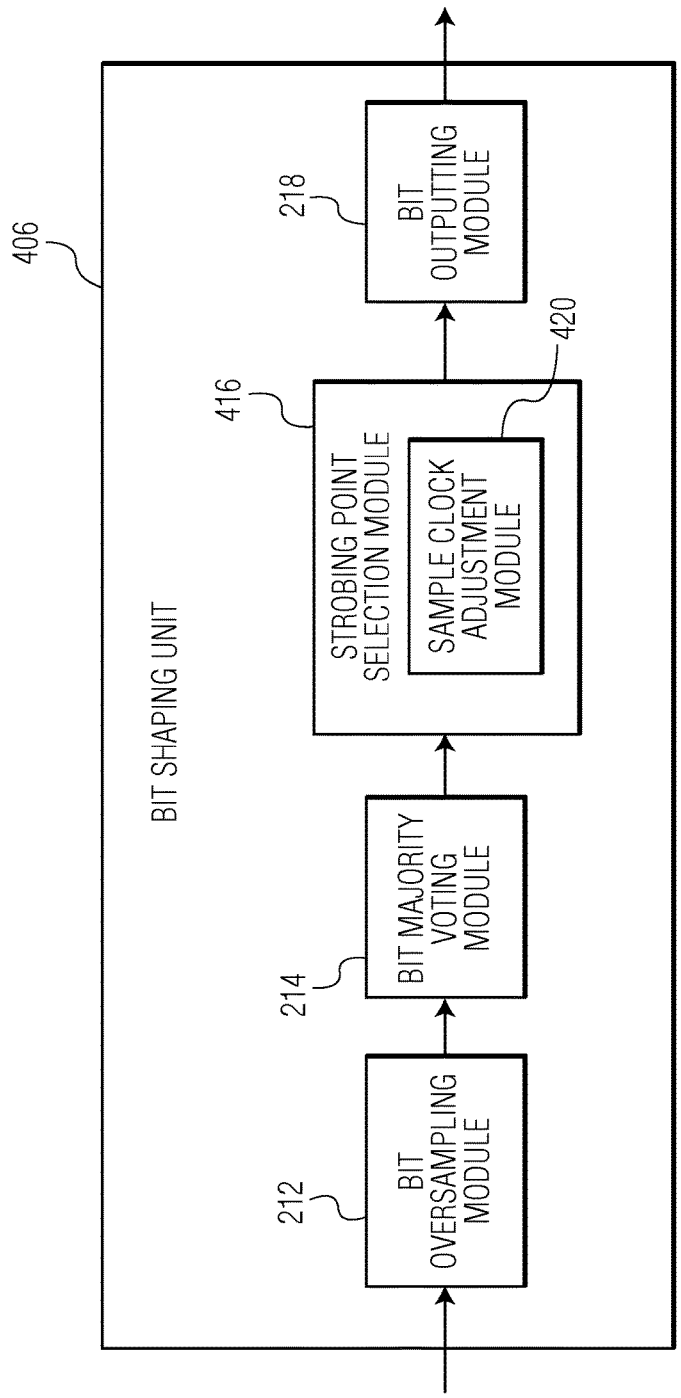
FIG. 4 depicts a second embodiment of the bit shaping unit of the receiver device of the communication network depicted in FIG. 1.

A bit strobing point is selected when the sample counter reaches a particular value, such as around the middle of the oversampling factor. The speed of the sample counter depends on the clock of the receiver device 104. Consequently, the spacing period between two consecutive strobing time points depends on the clock of the receiver device. The operation described in FIG. 3 is based on the assumption that, when the sample counter becomes half the oversampling factor, the corresponding sample represents the middle of the transmitted bit. However, the assumption only holds when the clocks of both the transmitter device 102 and the receiver device are identical. Typically, clocks of the transmitter device and the receiver device show a certain amount of frequency deviation. To account for the clock deviation, the sample counter of the receiver device needs to be adjusted over time. FIG. 4 depicts a second embodiment of the bit shaping unit 106 that can adjust the sample counter. Compared to the bit shaping unit 206 depicted in FIG. 2, a bit shaping unit 406 depicted in FIG. 4 includes a strobing point selection module 416, which includes an additional sample clock adjustment module 420 configured to adjust the sample counter. The sample clock adjustment module can adjust the sample counter in view of the clock deviation between the transmitter device and the receiver device. For example, the clock deviation between the transmitter device and the receiver device can cause the irregularity of the sample counter and the sample clock adjustment module can adjust the sample counter in view of the irregularity of the sample counter.

Figure 5:
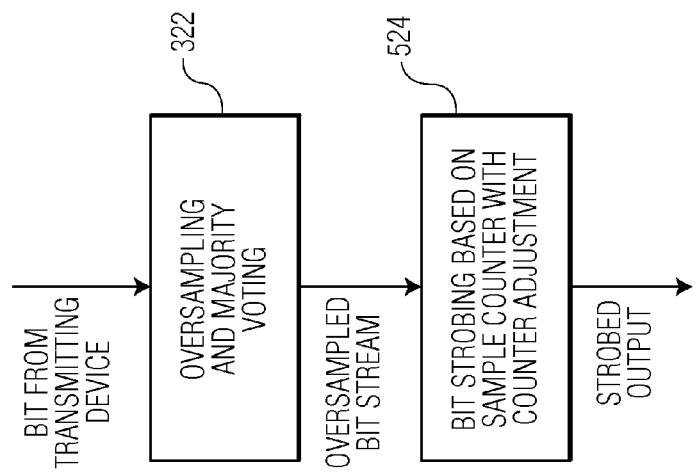
FIG. 5 illustrates an example operation of the bit shaping unit depicted in FIG. 4.

The transmitter device 102 can transmit bits stream having a bit pattern that is known to the receiver device 104 for clock synchronization purpose. In an embodiment, a synchronization edge (e.g., a rising edge or a falling edge) is transmitted between a fixed number of bits. For example, at the beginning of each transmitted byte or a number of transmitted bytes, a known bit edge can be added. When the known bit edge is received, the sample counter is reset to '1'. FIG. 5 illustrates an example operation of the bit shaping unit depicted in FIG. 4. In the embodiment depicted in FIG. 5, the example operation includes the oversampling and majority voting process 322 and a bit strobing process 524 that is based on sample counter adjustment. Compared to the example operation described with reference to FIG. 3, in the example operation illustrated in FIG. 5, output bits are generated using the adjusted sample counter.

Turning back to FIG. 1, the communication network 100 can be used for various applications. In an embodiment, the communication network 100 is used for an automotive application. Examples of automotive applications include, without limitation, vehicle dynamics such as braking, suspension, steering, driver assistance, intelligent parking assist, adaptive cruise control, fuel control, traction control, intelligent power assisted steering, lane departure warning, electronic power assisted steering and electronic stability control. For example, the communication network 100 facilitates communication among communication devices such as electronic controller nodes in an automobile system, which may be located within a single vehicle or distributed across multiple vehicles.

Figure 6:
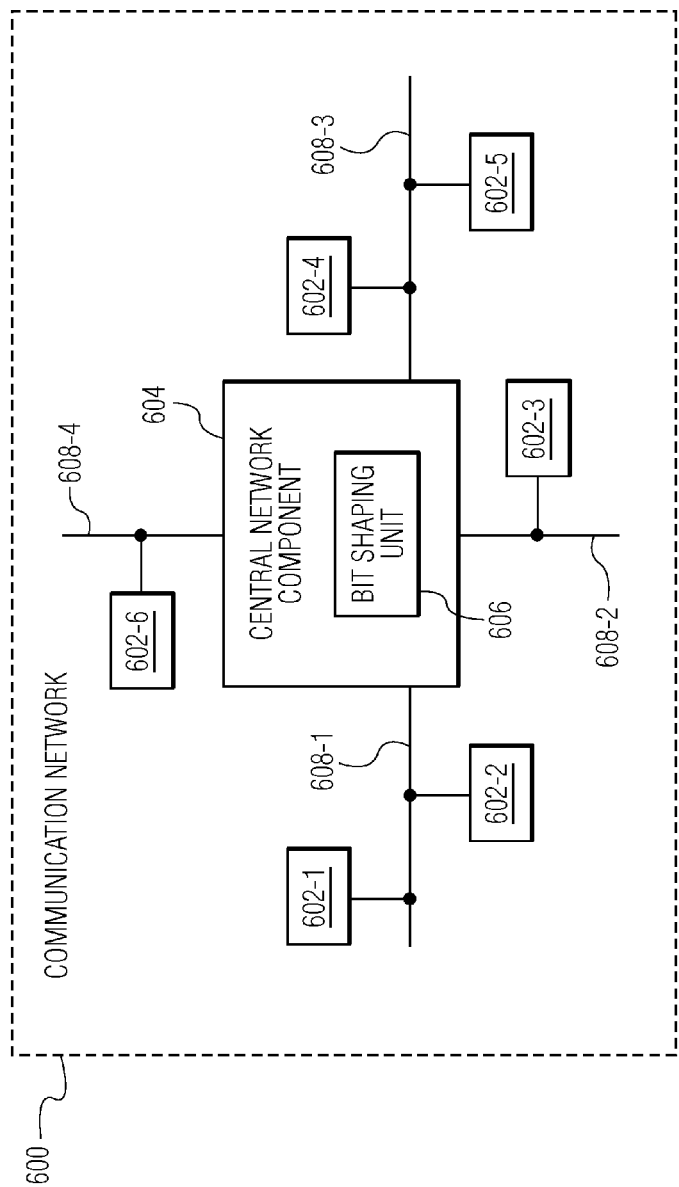
FIG. 6 depicts an embodiment of the communication network depicted in FIG. 1 that can be used for an automotive application.

FIG. 6 depicts an embodiment of the communication network 100 depicted in FIG. 1 that can be used for an automotive application. In the embodiment depicted in FIG. 6, a communication network 600 includes communication nodes 602-1, 602-2, 602-3, 602-4, 602-5, 602-6 and a central network component 604. The communication network 600 is configured to facilitate communication among the communication nodes. In an embodiment, the communication network 600 is configured to facilitate critical communication (e.g., safety critical communication) among the communication nodes. Although the communication network 600 is shown in FIG. 6 as including eight communication nodes, in some other embodiments, the communication network 600 includes more than or less than eight communication nodes. Although the communication network 600 is shown in FIG. 6 as including only one central network component, in some other embodiments, the communication network 600 includes multiple central network component.

The communication nodes 602-1, 602-2, 602-3, 602-4, 602-5, 602-6 of the communication network 600 are configured to transmit and receive data. The data transmitted and received by the communication nodes can be in any suitable format. In an embodiment, the data transmitted and received are data frames. In addition to communication, each of the communication nodes may be configured to perform an automotive application. In an embodiment, the communication nodes are electronic controller nodes in an automobile system. An electronic controller node contains an electronic control unit (ECU), which may be connected to sensors and actuators. The ECU typically collects data from the sensors, runs application software, controls the actuators, and communicates to other electronic controller nodes via the communication network.

The communication nodes 602-1, 602-2, 602-3, 602-4, 602-5, 602-6 transmit data frames to the buses or branches 608-1, 608-2, 608-3, 608-4 to which they are connected. Likewise, the nodes receive data frames from the bus/branch to which they are connected. The central network component 604 may forward a data frame from one branch to one or more destination branches in a number of different ways. For example, the central network component may not forward a data frame to any other branch except one destination branch. The central network component may forward a data frame to multiple branches, such as, to all other branches except the originating branch from which the data frame is received. The central network component 604 of the communication network 600 is configured to facilitate critical communication (e.g., safety critical communication) among the communication nodes 602-1, 602-2, 602-3, 602-4, 602-5, 602-6 in the communication network 600. For example, the central network component 604 controls communication data transmitted on buses or branches in the communication network 600. In an embodiment, the central network component 604 selectively blocks and selectively forwards data received on different data transmission buses or branches in the communication network. In some embodiments, the communication nodes 602-1, 602-2, 602-3, 602-4, 602-5, 602-6 communicate with other nodes exclusively through the central network component 604. The central network component 604 may be further configured to store a communication schedule of the communication nodes 602-1, 602-2, 602-3, 602-4, 602-5, 602-6 and configuration parameters. The central network component 604 can support a given number of buses in the communication network 600. In an embodiment, a sub-bus or other communication link/device is connected to a bus in the communication network and communication nodes that perform non-critical applications are connected to the sub-bus or the other communication link/device. In the embodiment depicted in FIG. 6, the central network component 604 is connected to four buses 608-1, 608-2, 608-3, 608-4 in the communication network 600. Specifically, the communication nodes 602-1, 602-2 are connected to the bus 608-1, the communication node 602-3 is connected to the bus 608-2, the communication nodes 602-4, 602-5 are connected to the bus 608-3, the communication node 602-6 is connected to the bus 608-4. In an embodiment, the four buses are serial communication buses in the communication network. The central network component may be a part of an In-Vehicle Network (IVN) system. Although the central network component is shown in FIG. 6 as being connected to four buses, in some other embodiments, the central network component is connected to more than or less than four buses. In an embodiment, at least one of the communication nodes 602-1, 602-2, 602-3, 602-4, 602-5, 602-6 is directly connected to a bus in the communication network. In other words, at least one of the communication nodes is connected to a bus in the communication network 600 without any intermediate device. In an embodiment, the robustness of safety critical communication of an application system such as an automobile system can be improved by connecting communication nodes in the application system to the central network component 604. For example, the central network component 604 can block unwanted communication in the automobile system and protect the safety critical communication.

The communication nodes 602-1, 602-2, 602-3, 602-4, 602-5, 602-6 are possible implementations of the transmitter device 102. However, the transmitter device can be implemented differently from the communication nodes depicted in FIG. 6. In addition, the central network component 604 is one of possible implementations of the receiver device 104. However, the receiver device can be implemented differently from the central network component depicted in FIG. 6. The invention is not restricted to the particular implementation of the communication nodes and the central network component depicted in FIG. 6.

In an embodiment, all of the communication nodes 602-1, 602-2, 602-3, 602-4, 602-5, 602-6 are communication nodes of a FlexRay™ communication system in accordance to the FlexRay™ communication system specifications developed by the FlexRay™ Consortium. A FlexRay™ communication system is a robust, scalable, deterministic and fault-tolerant digital serial bus system for automotive applications. For example, a FlexRay™ communication system can be used by a car manufacturer to adopt an in-vehicle network (IVN) with high data communication speeds to accommodate advanced features in automobiles. In this embodiment, the central network component 604 is connected to a channel of the FlexRay™ communication system to enable data transfer on the channel and to increase fault tolerance. A channel of the FlexRay™ communication system is a single communication medium, e.g., one network. For example, the FlexRay™ communication system specifications distinguish between two independent, parallel communication media, a channel A and a channel B. The central network component 604 may be implemented as a FlexRay-compatible central network component, such as a FlexRay-compatible switch or a FlexRay-compatible central bus guardian (CBG), which is designed, developed, manufactured, and/or configured compatibly with or in accordance to the FlexRay™ communication system specifications developed by the FlexRay™ Consortium. When the central network component is used to protect a channel of a FlexRay™ communication system, some critical faults (e.g., short circuited bus lines or erroneous behavior of a communication node) can be tolerated by the FlexRay™ communication system. In an embodiment, multiple central network components are cascaded on one channel of a FlexRay™ communication system. For example, if a single central network component is not connected to a sufficient number of buses/branches for a certain FlexRay™ communication system, multiple central network component can be cascaded on one channel of the FlexRay™ communication system such that a sufficient number of buses are provided.

Different factors within the communication network 600 can shorten or prolong the length of a transmitted bit. Due to the bit length distortion, a receiving communication node 602-1, 602-2, 602-3, 602-4, 602-5, or 602-6 may not be able to recognize the received bits correctly. If the central network component 604 forwards the distorted bit stream to other buses/branches 608-1, 608-2, 608-3, 608-4 of the communication network 600, interferences may cause more distortions and the nodes on the other buses/branches may not be able to recognize the bit stream correctly. The central network component can reshape the received bits from the communication nodes 602-1, 602-2, 602-3, 602-4, 602-5, 602-6 before forwarding them to other network nodes. In the embodiment depicted in FIG. 6, the central network component includes a bit shaping unit 606, which is the same as or similar to the bit shaping units 106, 206, 406 depicted in FIGS. 1, 2 and 4. The bit shaping unit 606 can shorten and prolong bits based on bit strobing with edge based sample counter adjustment. Consequently, the signal quality on different buses 608-1, 608-2, 608-3, 608-4 and more reliable communication between the communication nodes 602-1, 602-2, 602-3, 602-4, 602-5, 602-6 can be ensured.

Figure 7:
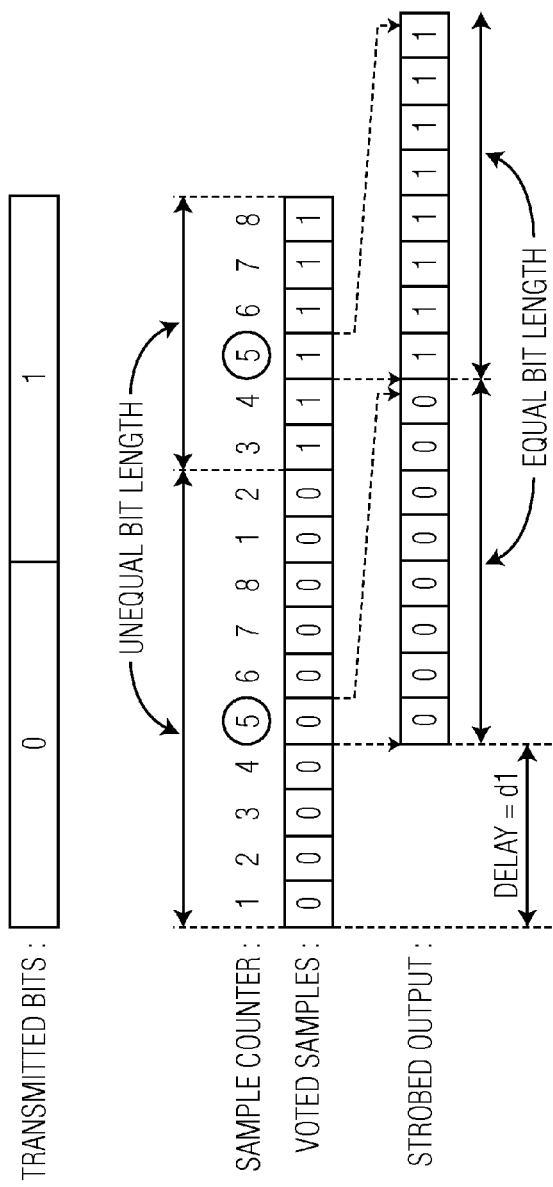
FIGS. 7 and 8 show some examples of transmitted bits, sample counter values, voted bit samples and output bits in the communication network depicted in FIG. 6.
Figure 8:
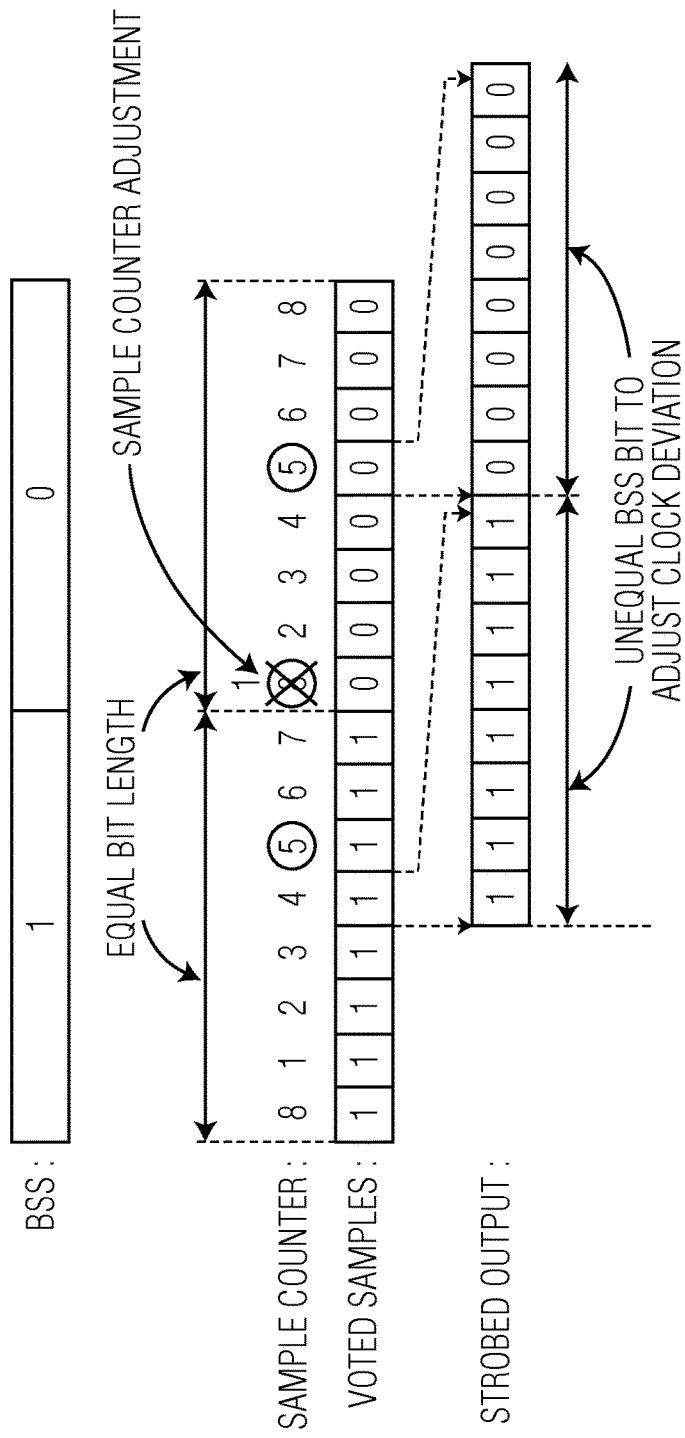

FIGS. 7 and 8 show some examples of transmitted bits, sample counter values, voted bit samples and strobed output bits in the communication network 600. In the examples shown in FIGS. 7 and 8, the oversampling factor is 8. In the example shown in FIG. 7, a communication node 602-1, 602-2, 602-3, 602-4, 602-5, or 602-6 sends a '0,' followed by a '1,' to the central network component 604. If there is no bit length distortion, the central network component will sample 8 zeros, followed by 8 ones. However, due to disturbances, the length of the received bit samples may change. In the example shown in FIG. 7, the oversampled bit stream of the first bit, '0,' has 10 bits and the oversampled bit stream of the second bit, '1,' has 6 bits. Short duration glitches may cause a '1' in between the run of zeros, and a '0' in between the run of ones. However, a majority voting with a sliding window of 5 samples can remove such glitches. A bit strobing time point is selected from the voted samples. Because the input is oversampled 8 times, the $5^{th}$ bit of each bit stream can be selected as the bit strobing time point and is outputted out of the central network component. In some embodiments, instead of the 5th bit of each bit stream, the 4th bit of each bit stream is selected as the bit strobing time point. Consequently, the length of each output bit becomes equal, which are 8 sample clocks of the central network component.

The bit strobing introduces delay into the relaying of the received bits. In the example shown in FIG. 7, the delay, "dl," due to the strobing technique is equal to 4 sample clocks. In addition to the delay introduced by the bit strobing, additional delays can be incurred due to the majority voting and sample register at the input. The total digital delay for the relaying of the received bits is equal to the sum of the input sample register delay, the majority voting delay and the strobing delay. For a majority voting between 5 samples, the voting delay is 3 sample clocks. When the input sample register introduces a delay of 1 sample clock, the total digital delay is 8 (i.e., 1+3+4) sample clocks.

In the example shown in FIG. 8, a communication node 602-1, 602-2, 602-3, 602-4, 602-5, or 602-6 sends a Byte Start Sequence (BSS) that includes a HIGH bit, '1,' followed by a LOW bit, '0,' to the central network component 604. For example, the FlexRay protocol uses a Byte Start Sequence (BSS) at the beginning of each byte. The falling edge of the BSS, which is the transition from HIGH bit to LOW bit, is used as the synchronization edge. If there is no bit length distortion, the sample counter of the will read 8, which is the oversampling factor, when the last sample of the HIGH bit is received. Afterward, the sample counter is reset to 1 and the central network component takes the first sample of the LOW bit. If the transmitting communication node has a faster clock than the central network component, the sample counter will read less than 8 when the last sample of the HIGH bit is received. In the example shown in FIG. 8, the sample counter reads 7 when the last sample of the HIGH bit is received. When the edge is received, the sample counter becomes 8. Because the central network component is aware of the synchronization edge, the central network component resets the sample counter to 1. The central network component adjusts the sample counter so that it becomes 2 with the arrival of the next voted sample. Because the input is oversampled 8 times, the 5th bit of each bit stream can be selected as the bit strobing time point and is outputted out of the central network component, which causes the first bit of the BSS to have a shorter duration of 7 samples, instead of the nominal 8 samples. In some embodiments, instead of the 5th bit of each bit stream, the 4th bit of each bit stream is selected as the bit strobing time point.

FIG. 9 is a process flow diagram of a method for bit processing in a central network component for facilitating communication among communication nodes in accordance with an embodiment of the invention. The central network component may be similar to or same as the central network component 604 depicted in FIG. 6. At block 902, bits received at the central network component from a first communication node of the communication nodes are oversampled with an oversampling factor to generate oversampled bit streams. At block 904, time points are selected in the oversampled bit streams, where the time points correspond to inner samples of the oversampled bit streams with respect to the oversampling factor. At block 906, the inner samples are outputted out of the central network component to a second communication node of the communication nodes between the time points.

The various components or units of the embodiments that have been described or depicted (e.g., the bit shaping unit 106, 206, 406, or 606) may be implemented in hardware, software that is stored in a non-transitory computer readable medium or a combination of hardware and software that is stored in a non-transitory computer readable medium. The non-transitory computer readable medium can be an electronic, magnetic, optical, electromagnetic, infrared, or semiconductor system (or apparatus or device), or a propagation medium. Examples of a non-transitory computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), a digital video disk (DVD), and a Blu-ray disk. Furthermore, the various components or units of the embodiments (e.g., the bit shaping unit 106, 206, 406, or 606) that have been described or depicted may be implemented in a processor, which may include a multifunction processor and/or an application-specific processor.

Although the operations of the method herein are shown and described in a particular order, the order of the operations of the method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

In addition, although specific embodiments of the invention that have been described or depicted include several components described or depicted herein, other embodiments of the invention may include fewer or more components to implement less or more feature.

Furthermore, although specific embodiments of the invention have been described and depicted, the invention is not to be limited to the specific forms or arrangements of parts so described and depicted. The scope of the invention is to be defined by the claims appended hereto and their equivalents.

What is claimed is:

1. A FlexRay-compatible central bus guardian (CBG) for facilitating communication among communication nodes that are connected to each other only through the FlexRay-compatible CBG, the FlexRay-compatible CBG comprising:
a bit oversampling module configured to oversample a plurality of bits received from a first communication node of the communication nodes that is directly connected to the FlexRay-compatible CBG with an oversampling factor to generate oversampled bit streams, wherein the oversample factor is a positive integer that is greater than or equal to sixteen and is agreed by the first communication node and the FlexRay-compatible CBG;
a bit majority voting module configured to perform majority voting to the oversampled bit streams using a slide window having three samples;
a strobing time point selection module configured to select time points in the oversampled bit streams after the majority voting, wherein the time points correspond to inner samples of the oversampled bit streams with respect to the oversampling factor, wherein the strobing time point selection module is further configured to select each time point in a respective oversampled bit stream of the oversampled bit streams when a sample counter within the FlexRay-compatible CBG is greater than or equal to a sum of a half of the oversampling factor and three, wherein the strobing time point selection module includes a sample clock adjustment module configured to adjust the sample counter within the FlexRay-compatible CBG that is used for selecting the time points, wherein the adjustment is performed to account for discrepancies due to a clock deviation between the first communication node and the FlexRay-compatible CBG, wherein the sample clock adjustment module is further configured to reset the sample counter within the FlexRay-compatible CBG to one in response to a rising synchronization edge that is known to the FlexRay-compatible CBG, wherein a fixed number of bits between which the rising synchronization edge is transmitted is agreed by the first communication node and the FlexRay-compatible CBG, and wherein the strobing time point selection module is further configured to select a first time point in the oversampled bit streams before the rising synchronization edge and a second time point in the oversampled bit streams after the rising synchronization edge such that the time difference between the first and second time points is equal to a fixed number of sample clocks when the length of the oversampled bit streams are different; and
a bit outputting module configured to output delayed versions of the inner samples to a second communication node of the communication nodes that is directly connected to the FlexRay-compatible CBG between the time points.

2. The FlexRay-compatible CBG of claim 1, wherein the bit outputting module is further configured to output one of the inner samples out of the FlexRay-compatible CBG between a corresponding time point of the time points and a subsequent time point of the time points.

3. The FlexRay-compatible CBG of claim 1, wherein the bit outputting module is further configured to, from one of the time points, keep a corresponding one of the inner samples as the output bit of the FlexRay-compatible CBG until a next time point.

4. The FlexRay-compatible CBG of claim 1, wherein the strobing time point selection module is further configured to: increase the sample counter for each bit in one of the oversampled bit streams; and select a time point in the one of the oversampled bit streams when the sample counter is greater than or equal to the sum of a half of the oversampling factor and three.

5. The FlexRay-compatible CBG of claim 1, wherein the bit oversampling module is further configured to oversample a first received bit to generate a first oversampled bit stream and oversample a second received bit to generate a second oversampled bit stream, wherein the strobing time point selection module is further configured to select a first time point that corresponds to an inner sample in the first oversampled bit stream and select a second time point that corresponds to an inner sample in the second oversampled bit stream, wherein the bit outputting module is further configured to output the inner sample in the first oversampled bit stream to the second communication node between the first time point and the second time point.

6. The FlexRay-compatible CBG of claim 1, wherein the plurality of bits includes a bit pattern that is known to the FlexRay-compatible CBG, and wherein the time point selection module is further configured to adjust the sample counter in response to the bit pattern.

7. The FlexRay-compatible CBG of claim 1, wherein the time point selection module is further configured to select the time points in the oversampled bit streams such that time differences between adjacent time points are equivalent when the length of the bits received from the first communication node are different.

8. The FlexRay-compatible CBG of claim 1, wherein the sample clock adjustment module is further configured to increase the sample counter within the FlexRay-compatible CBG to two with an arrival of a next voted sample.

9. A FlexRay-compatible central bus guardian (CBG) for facilitating communication among FlexRay-compatible communication nodes in an automobile system that are connected to each other only through the FlexRay-compatible CBG, the FlexRay-compatible CBG comprising:

a bit oversampling module configured to oversample a plurality of bits received from a first FlexRay-compatible communication node of the FlexRay-compatible communication nodes that is directly connected to the FlexRay-compatible CBG with an oversampling factor to generate oversampled bit streams, wherein the oversample factor is a positive integer that is greater than or equal to sixteen and is agreed by the first communication node and the FlexRay-compatible CBG;

a bit majority voting module configured to perform majority voting to the oversampled bit streams using a slide window having three samples;

a strobing time point selection module configured to select time points in the oversampled bit streams after the majority voting, wherein the time points correspond to inner samples of the oversampled bit streams with respect to the oversampling factor, wherein the strobing time point selection module is further configured to select each time point in a respective oversampled bit stream of the oversampled bit streams when a sample counter within the FlexRay-compatible CBG is greater than or equal to a sum of a half of the oversampling factor and three, wherein the strobing time point selection module includes a sample clock adjustment module configured to adjust the sample counter within the FlexRay-compatible CBG that is used for selecting the time points, wherein the adjustment is performed to account for discrepancies due to a clock deviation between the first communication node and the FlexRay-compatible CBG, wherein the sample clock adjustment module is further configured to reset the sample counter within the FlexRay-compatible CBG to one in response to a rising synchronization edge that is known to the FlexRay-compatible CBG, wherein a fixed number of bits between which the rising synchronization edge is transmitted is agreed by the first communication node and the FlexRay-compatible CBG, and wherein the strobing time point selection module is further configured to select a first time point in the oversampled bit streams before the rising synchronization edge and a second time point in the oversampled bit streams after the rising synchronization edge such that the time difference between the first and second time points is equal to a fixed number of sample clocks when the length of the oversampled bit streams are different; and a bit outputting module configured to output delayed versions of the inner samples to a second FlexRay-compatible communication node of the FlexRay-compatible communication nodes that is directly connected to the FlexRay-compatible CBG between the time points.

10. A method for bit processing in a FlexRay-compatible CBG for facilitating communication among communication nodes that are connected to each other only through the FlexRay-compatible CBG, the method comprising:

oversampling a plurality of bits received at the FlexRay-compatible CBG from a first communication node of the communication nodes that is directly connected to the FlexRay-compatible CBG with an oversampling factor to generate oversampled bit streams, wherein the oversample factor is a positive integer that is greater than or equal to sixteen and is agreed by the first communication node and the FlexRay-compatible CBG;

performing majority voting to the oversampled bit streams using a slide window having three samples;

selecting time points in the oversampled bit streams after the majority voting, wherein the time points correspond to inner samples of the oversampled bit streams with respect to the oversampling factor, wherein selecting the time points comprises selecting each time point in a respective oversampled bit stream of the oversampled bit streams when a sample counter within the FlexRay-compatible CBG is greater than or equal to a sum of a half of the oversampling factor and three, wherein selecting the time points comprises selecting a first time point in the oversampled bit streams before a rising synchronization edge and a second time point in the oversampled bit streams after the rising synchronization edge such that the time difference between the first and second time points is equal to a fixed number of sample clocks when the length of the oversampled bit streams are different;

adjusting the sample counter within the FlexRay-compatible CBG that is used for selecting time points, wherein the sample counter is adjusted to account for discrepancies due to a clock deviation between the first communication node and the FlexRay-compatible CBG, and wherein adjusting the sample counter within the FlexRay-compatible CBG comprises reset the sample counter within the FlexRay-compatible CBG to one in response to the rising synchronization edge that is known to the FlexRay-compatible CBG, wherein a fixed number of bits between which the rising synchronization edge is transmitted is agreed by the first communication node and the FlexRay-compatible CBG; and outputting delayed versions of the inner samples out of the FlexRay-compatible CBG to a second communication node of the communication nodes that is directly connected to the FlexRay-compatible CBG between the time points.

11. The method of claim 10, wherein outputting the inner samples comprises outputting one of the inner samples out of the FlexRay-compatible CBG between a corresponding time point of the time points and a subsequent time point of the time points.

12. The method of claim 10, wherein outputting the inner samples comprises from one of the time points, keeping a corresponding one of the inner samples as the output bit of the FlexRay-compatible CBG until a next time point.

13. The method of claim 10, wherein selecting the time points in the oversampled bit streams comprises: increasing the sample counter for each bit in one of the oversampled bit streams; and selecting a time point in the one of the oversampled bit streams when the sample counter is greater than or equal to the sum of a half of the oversampling factor and three.

14. The method of claim 10, wherein the plurality of bits includes a bit pattern that is known to the FlexRay-compatible CBG, and wherein the method further comprises adjusting a sample counter in response to the bit pattern.

* * * * *